United States Patent [19]

Miura

[11] Patent Number: 4,540,043

[45] Date of Patent: Sep. 10, 1985

[54] HEAT-GENERATING DEVICE

[75] Inventor: Mitsuyoshi Miura, Itako, Japan

[73] Assignee: Hirohiko Yasuda, Saitama, Japan

[21] Appl. No.: 525,671

[22] Filed: Aug. 23, 1983

[30] Foreign Application Priority Data

Aug. 23, 1982 [JP] Japan .................................. 57-144675
Sep. 25, 1982 [JP] Japan .................................. 57-166056
Oct. 14, 1982 [JP] Japan .................................. 57-179032
Jun. 3, 1983 [JP] Japan .................................... 58-97934

[51] Int. Cl.$^3$ .......................... F28D 21/00; F25B 15/00
[52] U.S. Cl. .................................. 165/104.12; 62/476; 62/485
[58] Field of Search ...................... 165/104.12; 62/476, 62/484, 485

[56] References Cited

U.S. PATENT DOCUMENTS 4,410,028 10/1983 Alefeld et al. .................. 165/104.12

FOREIGN PATENT DOCUMENTS 47191 3/1982 Japan .............................. 165/104.12

Primary Examiner—Albert W. Davis, Jr.
Attorney, Agent, or Firm—Sherman & Shalloway

[57] ABSTRACT

A heat-generating device comprising a solution tank containing a heat-generating composition composed of a solution capable of generating the heat of absorption when absorbing a solvent and a certain specific oil, a solvent tank for supplying the solvent to the solution tank, and a heat-exchanging chamber disposed between the vapor phase of the solution tank and the solvent tank. This device can be utilized in a heating or cooling system a hot water supply system, etc.

6 Claims, 23 Drawing Figures

HEAT-GENERATING DEVICE

BACKGROUND OF THE INVENTION

1. Field of the Invention

This invention relates to a heat-generating device using the heat of absorption, a kind of energy generated by a difference in concentration, which a solution produces upon absorbing a solvent vapor.

2. Description of the Prior Art

Generally, heating or warming means utilize the heat of combustion of fossil fuels such as petroleum and coal or the Joule's heat due to an electrical energy either directly or indirectly through a heat medium. When fossil fuels are used, their large amounts of heat generation often cause accidents of fire or damages or injuries such as burns. Furthermore, burning of these fossil fuels produces toxic gases or causes oxygen deficiency. This leads to air pollution, and is liable to induce gas poisoning. Hence, this way of generating heat lacks safety. In addition, fuels must be incessantly replenished, and the cost of the fuels has risen year by year owing to the scarcity of resources. On the other hand, the utilization of an electrical energy is safe because the amount of heat generation is relatively small. But it has the defect of requiring a high cost of running.

In recent years, an energy based on a difference in concentration has attracted attention as one substitute for such fossil fuels and electrical energy. The energy based on a difference in concentration denotes an energy which is generated as the concentration of a substance varies. As a heat phenomenon, it appears in the form of heat of mixing which is generated or absorbed when two substances are mixed. This heat of mixing is called the heat of dissolution, the heat of dilution or the heat of absorption according to the phases of the substances to be mixed. Among them, the heat of absorption owing to mixing of a gas and a liquid has previously been utilized in an absorption-type heating and cooling system.

The principle of the conventional absorption-type heating and cooling system is shown in FIG. 1 of the accompanying drawings. Generally, this system is comprised of a concentration chamber V for concentrating an aqueous solution by solar heat or waste heat, an absorption chamber W for causing the concentrated solution formed in the concentration chamber V to absorb steam thereby generating the heat of absorption, a condenser chamber X for liquefying the steam generated from the concentration chamber V, and an evaporation chamber Y for gasifying pure water formed in the condenser chamber X and supplying steam to the absorption chamber W. Cooling is performed by utilizing the heat of gasification generated in the evaporation chamber Y, and heating is carried out by the heat of absorption generated in the absorption chamber W. Since this system is constructed by independently providing the concentration chamber V, the absorption chamber W, the condenser chamber X and the evaporation chamber Y, and connecting them to each other by pipings, the system becomes large in scale and its heat efficiency is low.

SUMMARY OF THE INVENTION

It is an object of this invention to provide a novel heat-generating device which removes the defects of the conventional system.

According to this invention, there is provided a heat generating device comprising a solution tank containing a heat-generating composition capable of generating the heat of absorption when absorbing a solvent, a solvent tank for supplying the solvent to the solution tank, and a heat-exchanging chamber disposed between the vapor phase of the solution tank and the solvent tank.

BRIEF DESCRIPTION OF THE ACCOMPANYING DRAWINGS

Figure 4:
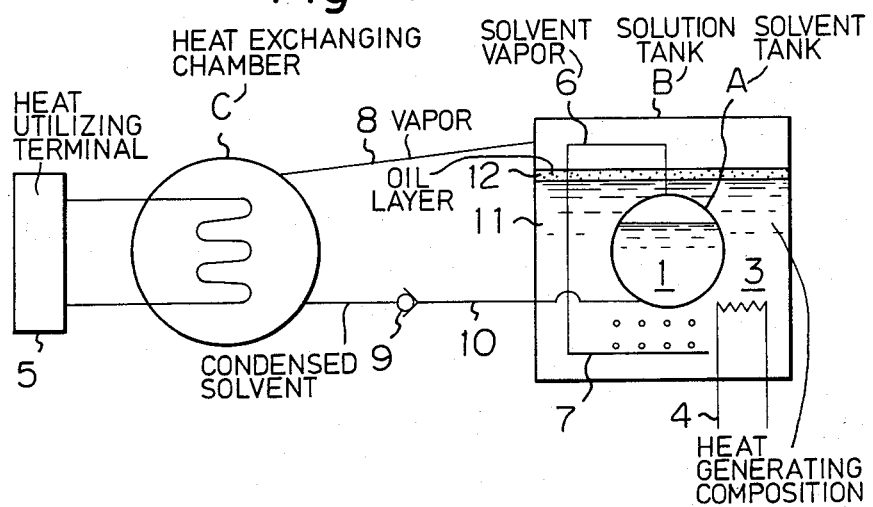
FIG. 4 is a system diagram showing another example of the heating system illustrated in FIG. 2.
Figure 8:
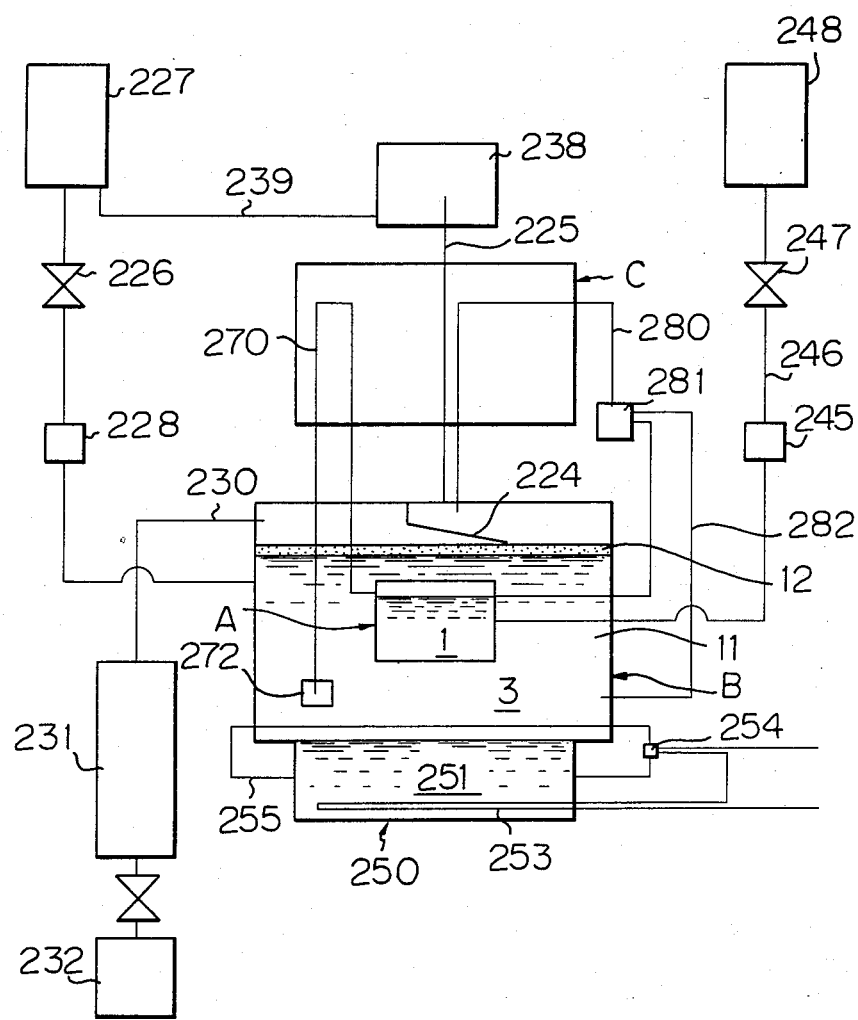
Figure 9:
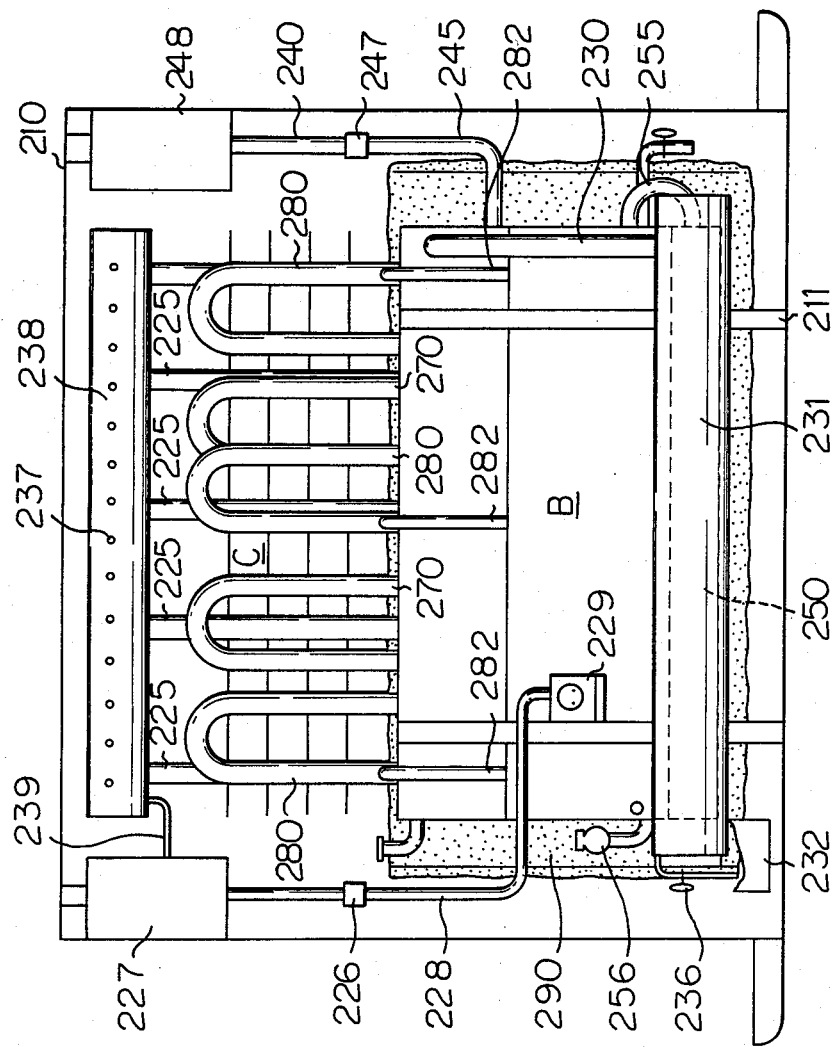
Figure 10:
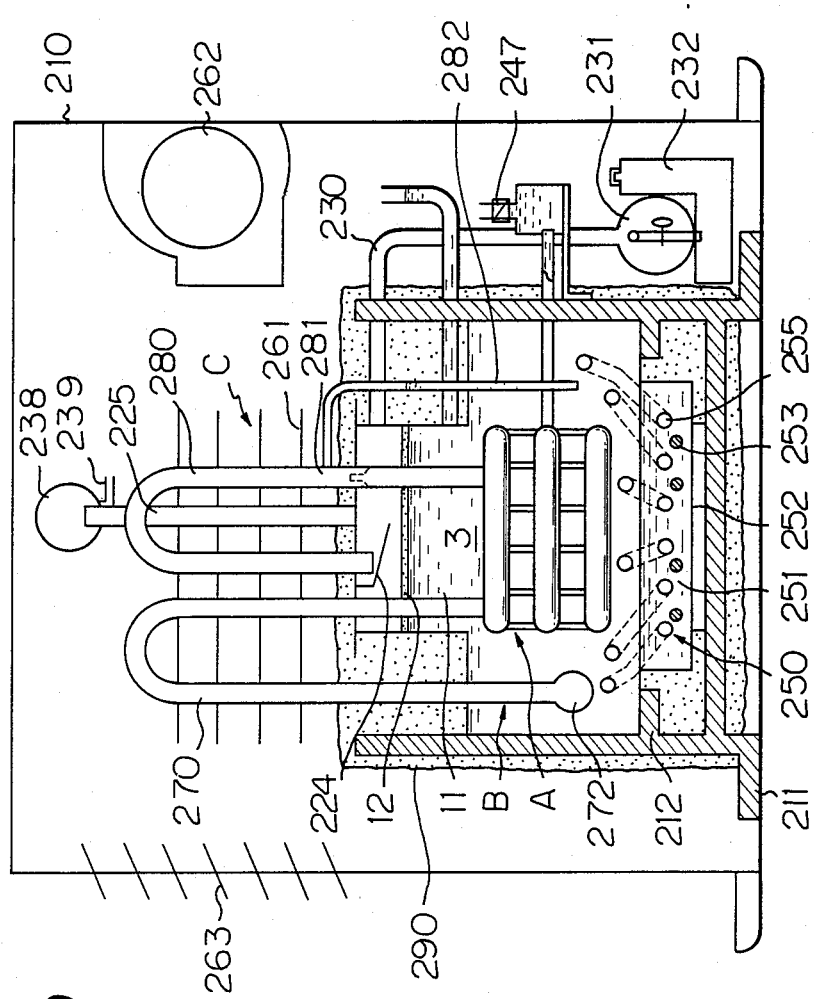
Figure 11:
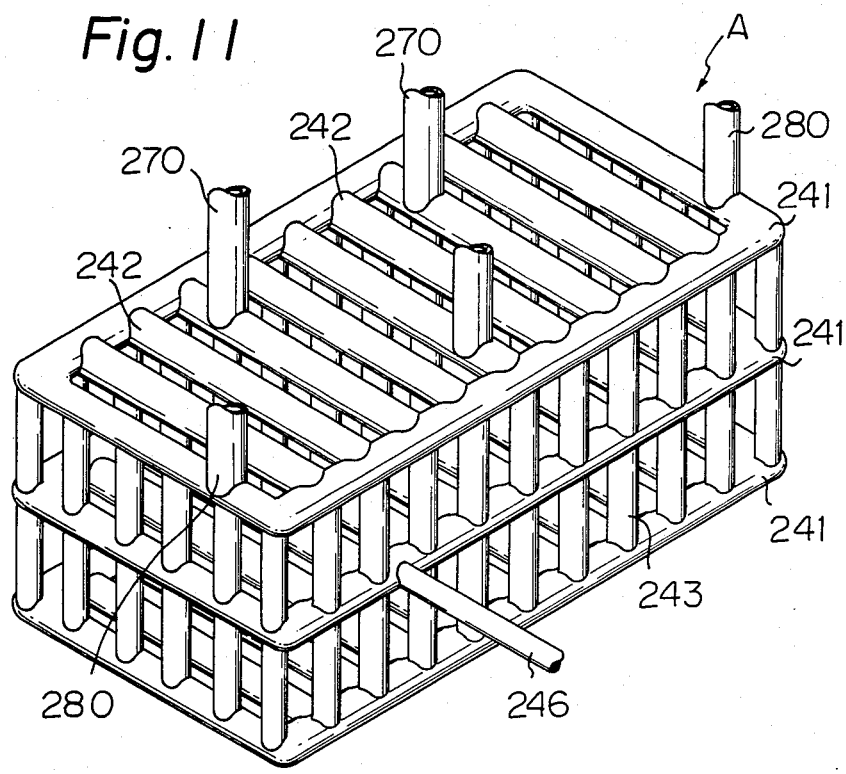
Figure 12:
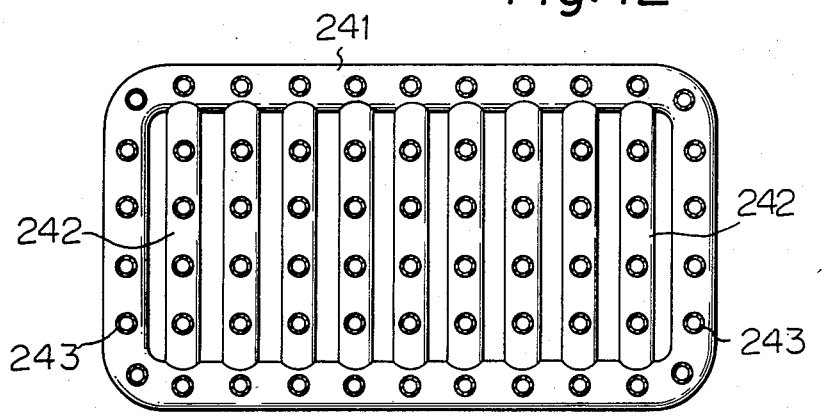
Figure 13:
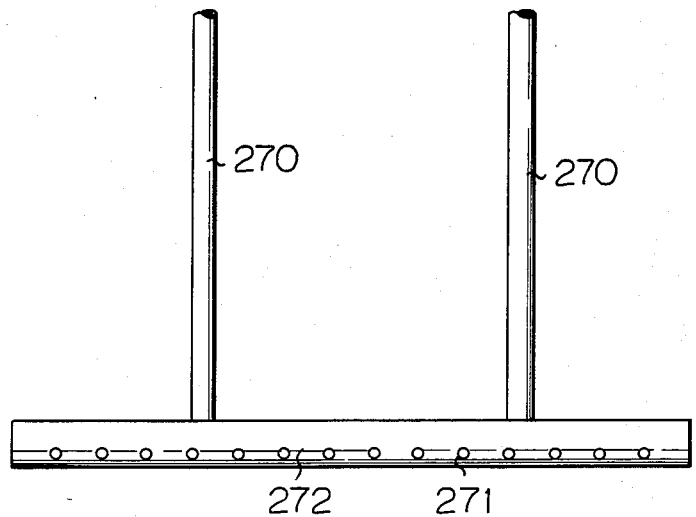
Figure 14:
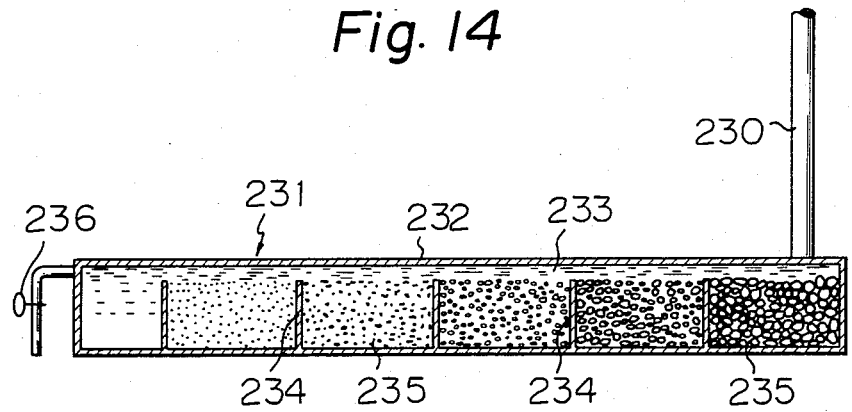
Figure 15:
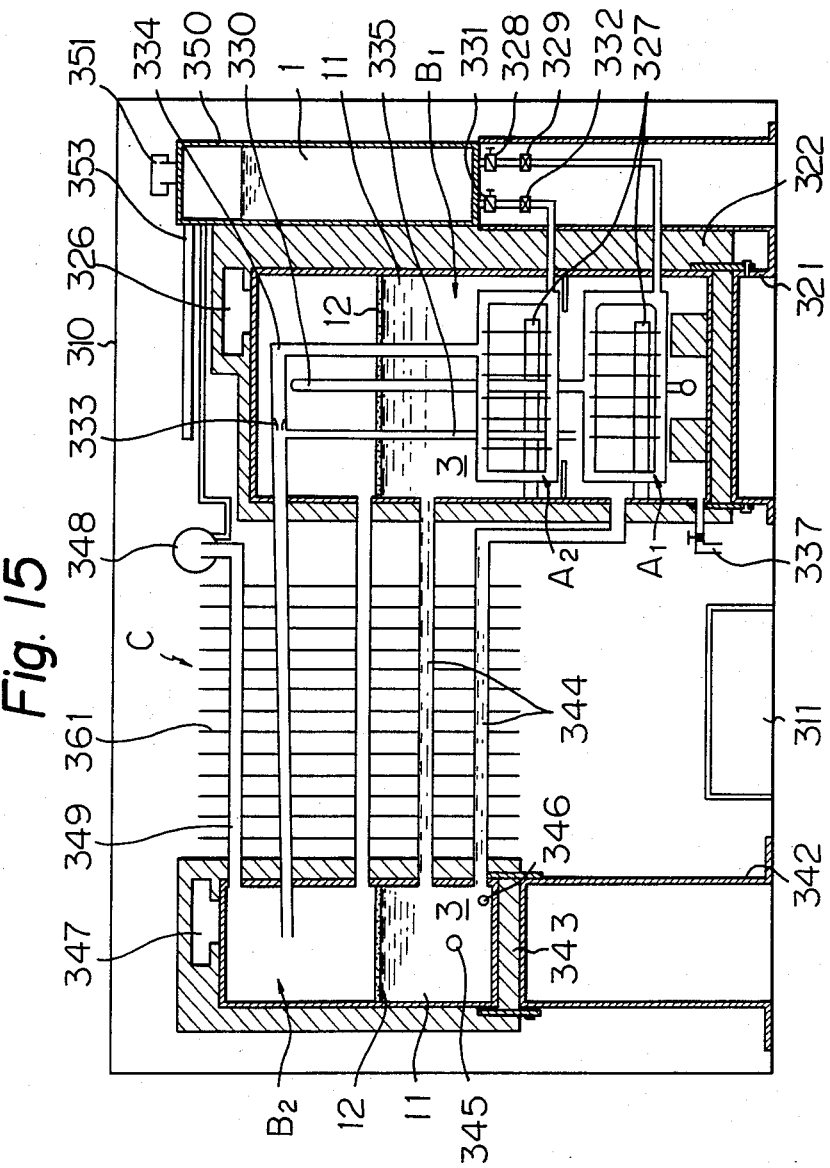
Figure 16:
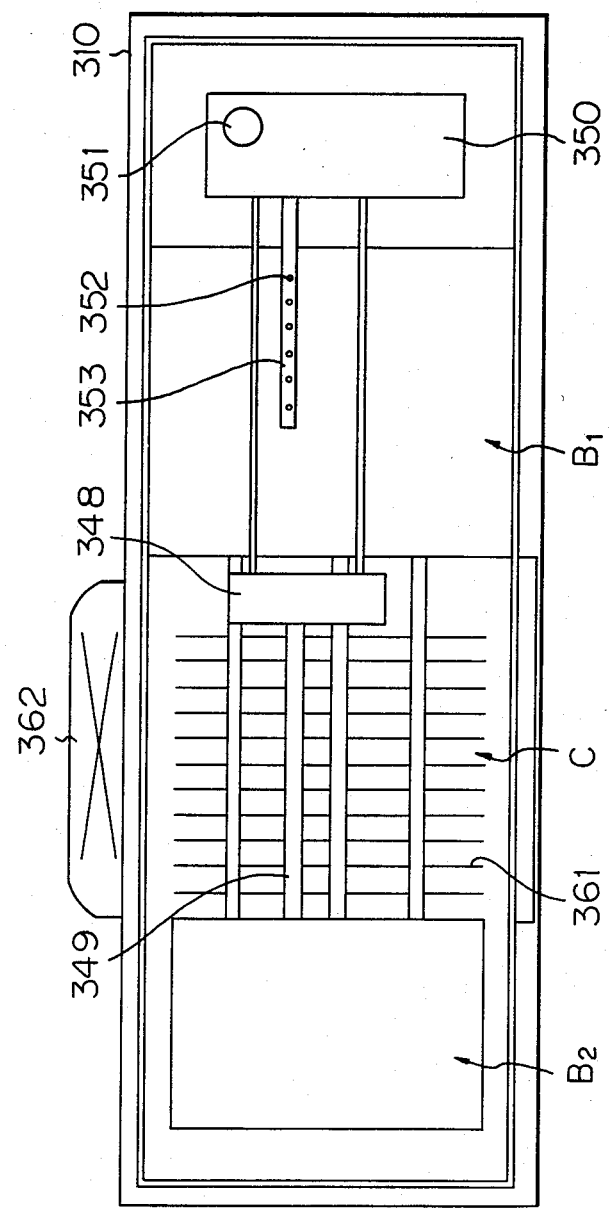
Figure 17:
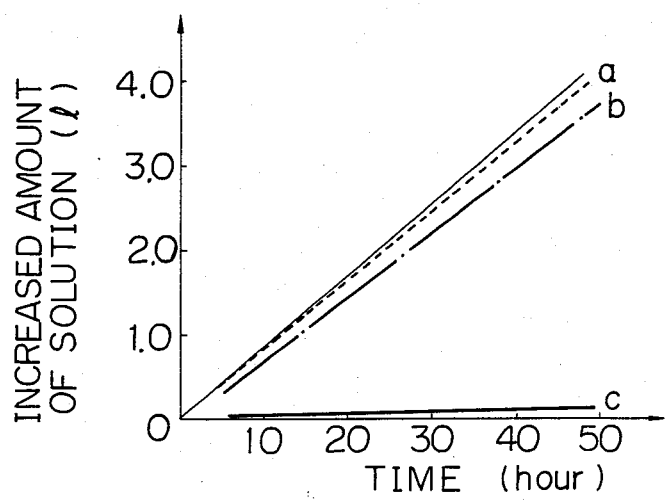
Figure 18:
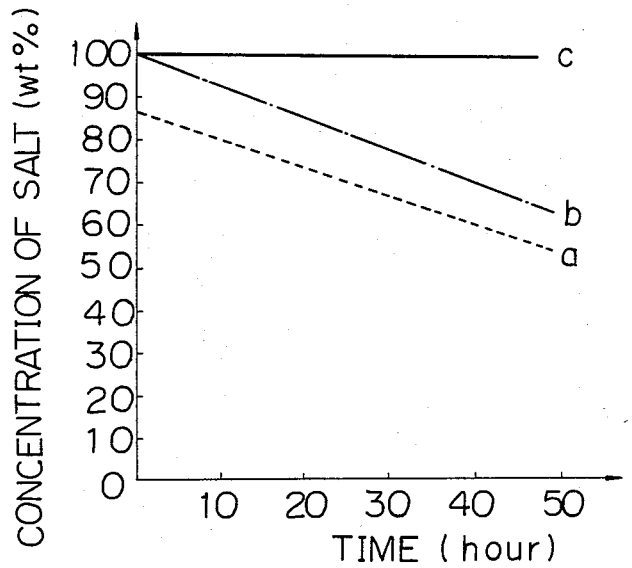
Figure 19:
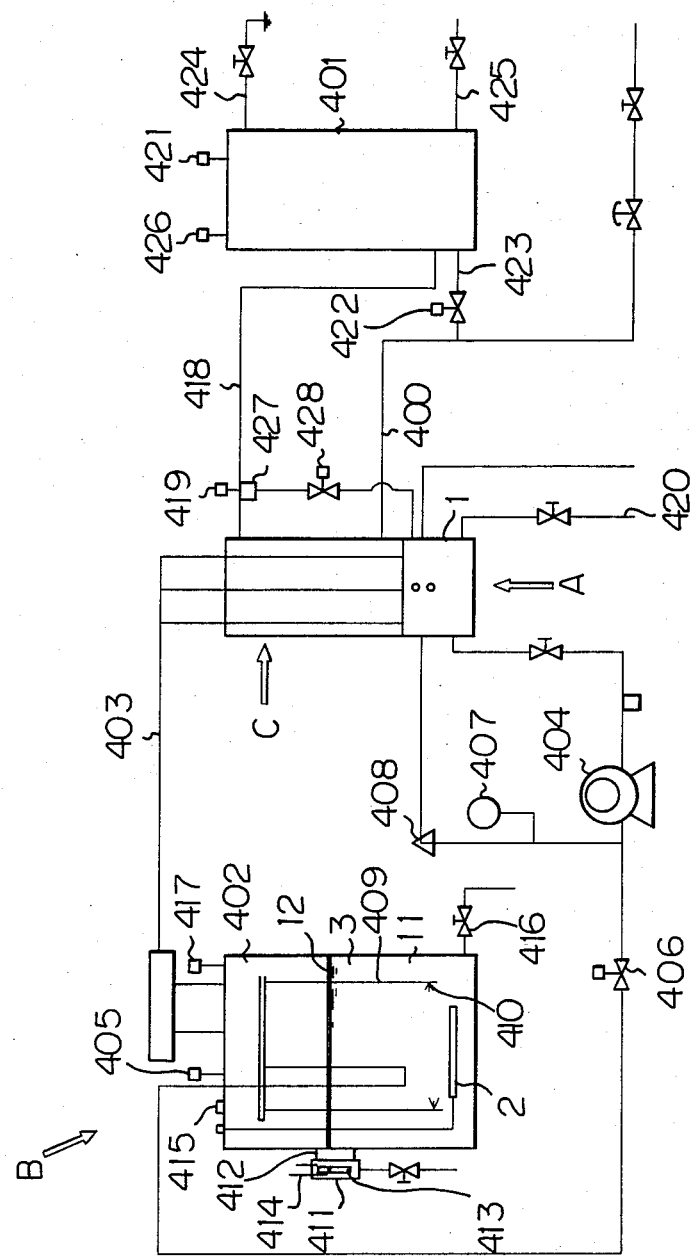
Figure 20:
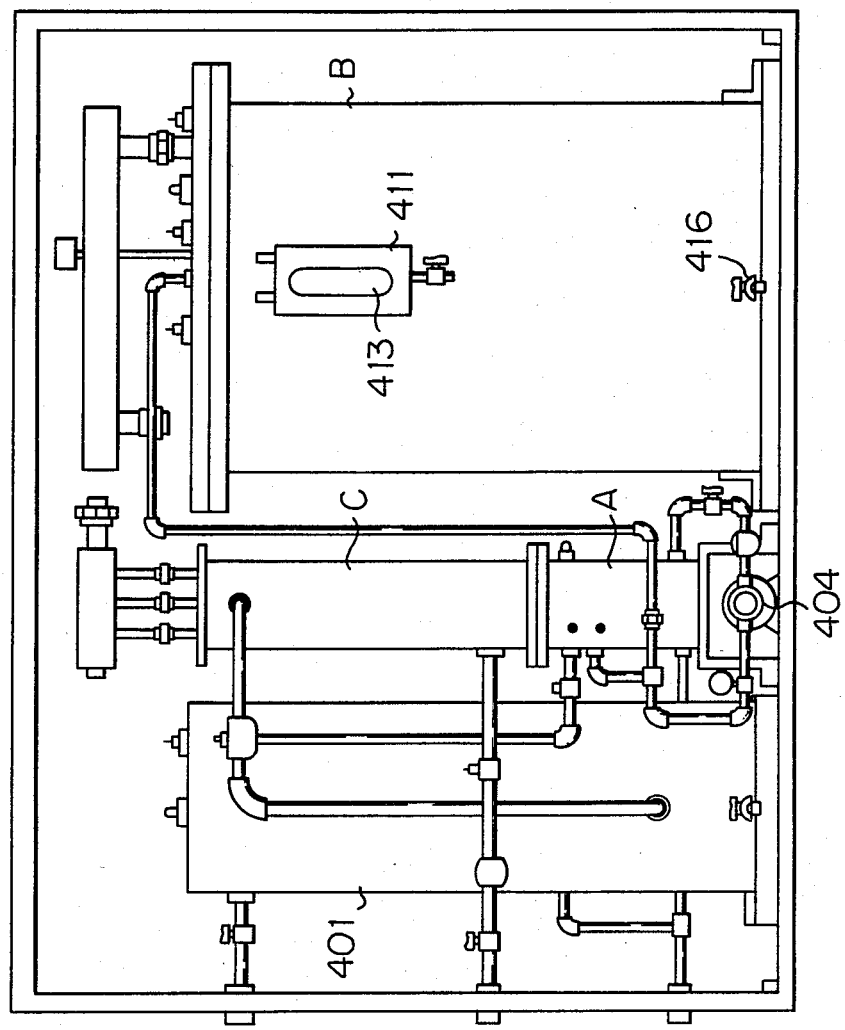
Figure 21:
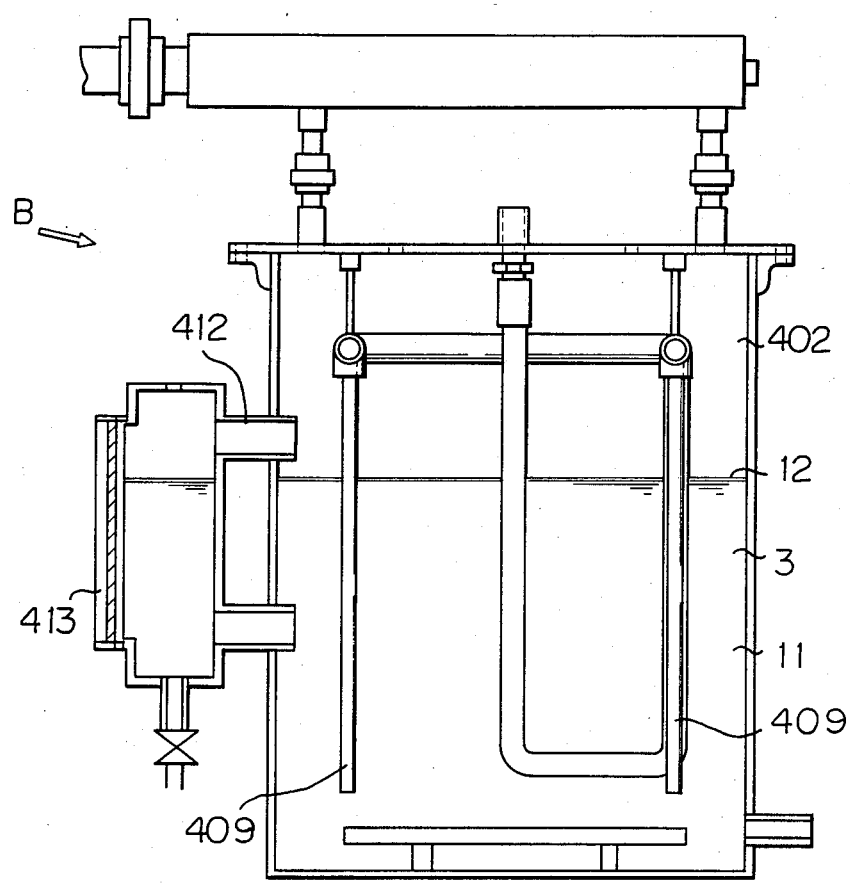
Figure 22:
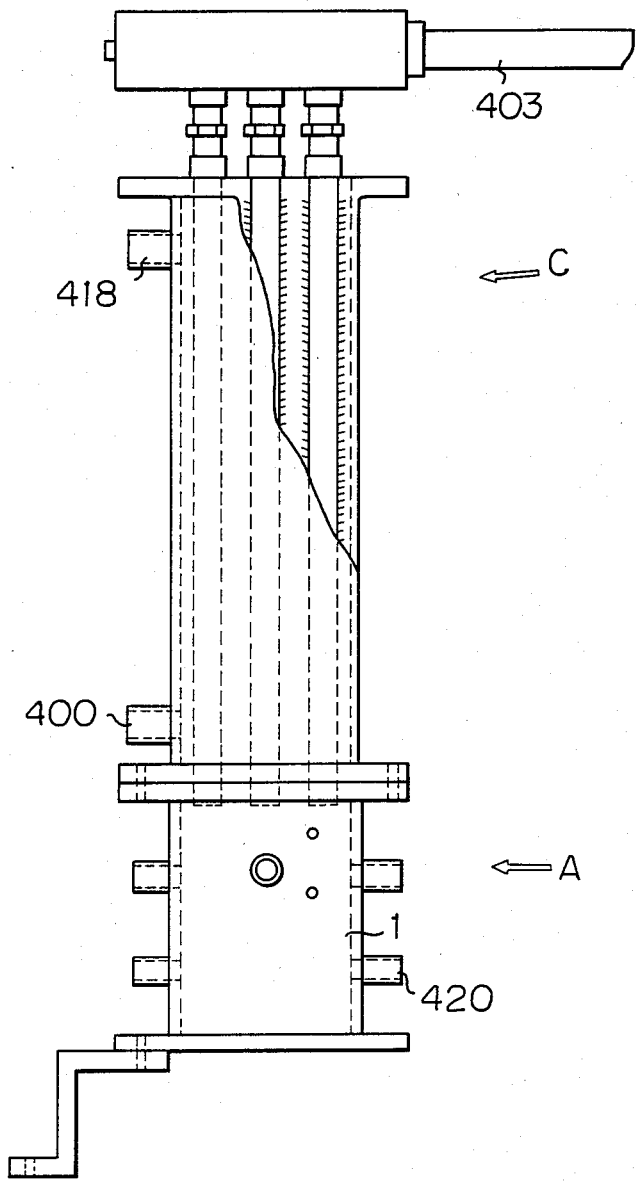
Figure 23:
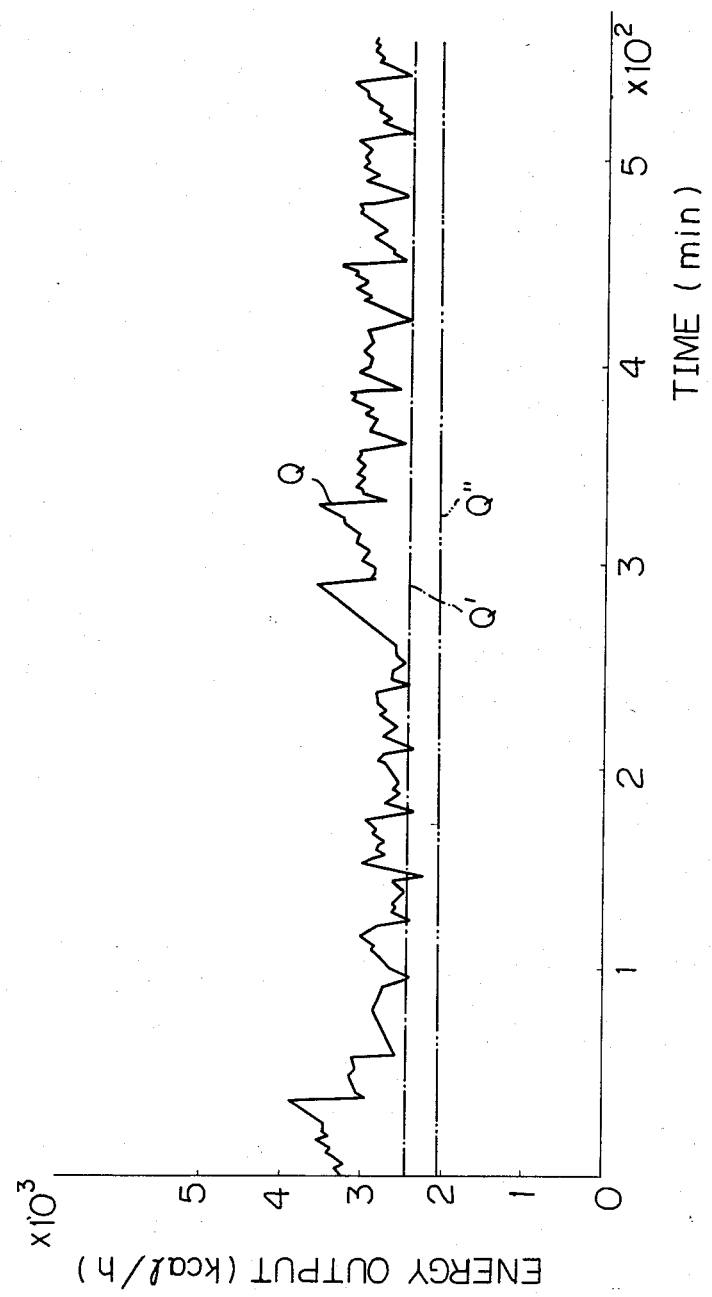

FIGS. 8 to 14 show a heating device embodying the example shown in FIG. 4, FIG. 8 being a system diagram thereof, FIG. 9 being a front elevation thereof, FIG. 10 being a longitudinal sectional view thereof, FIG. 11 being a perspective view of a solvent tank, FIG. 12 being a cross-sectional view of the solvent tank shown in FIG. 11, FIG. 13 being a front elevation of a blow-off pipe, and FIG. 14 being a sectional view of a discharge liquid strainer;

FIGS. 15 and 16 also show a heating device embodying the example shown in FIG. 4, FIG. 15 being a longitudinal sectional view thereof, and FIG. 16 being a top plan view thereof;

FIGS. 17 and 18 are graphs showing the results of experiments, FIG. 17 being a graph showing the amount of increase of a solution with respect to the amount of a solvent supplied and FIG. 18 being a graph showing variations in the concentration of a solution with variations in the volume of the solution; and FIGS. 19 to 23 show a hot water supply system as an example of the present invention, FIG. 19 being a system diagram thereof, FIG. 20 being a front elevation thereof, FIG. 21 being a sectional view of a solution tank, FIG. 22 being a sectional view of a heat-exchanging chamber, and FIG. 23 being a graph showing the results of an experiment.

DETAILED DESCRIPTION OF THE PREFERRED EMBODIMENTS

Figure 1:
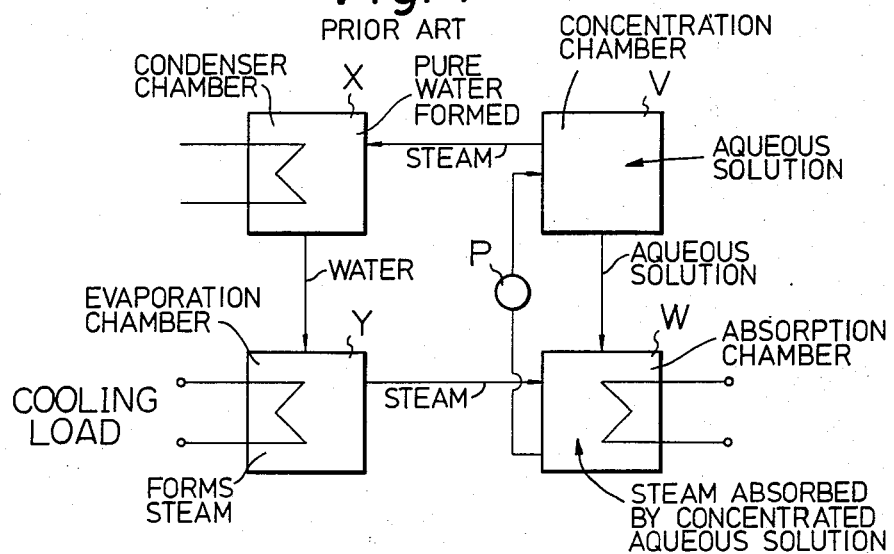
FIG. 1 is a diagram illustrating the principle of a conventional absorption-type cooling and heating system.
Figure 2:
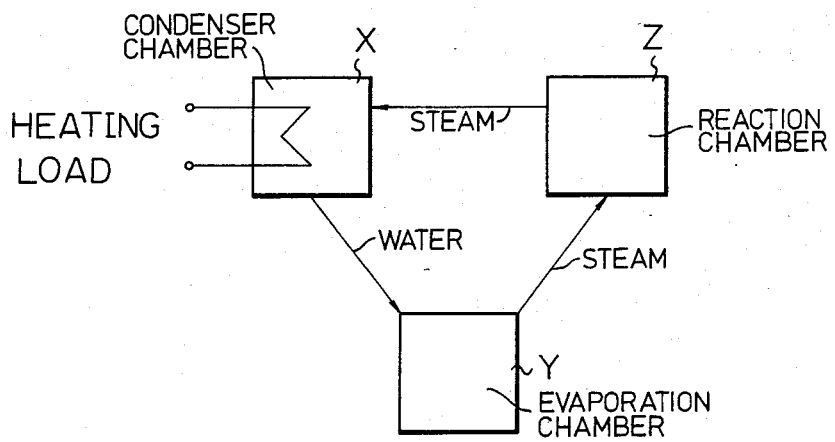
FIG. 2 is a diagram illustrating the principle of a heating system using a heat-generating composition in accordance with this invention.

The principle of the heat-generating device of this invention is shown in FIG. 2. The reference letter Z in the drawing represents a reaction chamber which concurrently acts as the concentration chamber V and the absorption chamber W in the conventional absorption-type heating system. Steam generated from the reaction chamber Z releases heat and is liquefied in a condenser chamber X and fed to an evaporation chamber Y. Furthermore, steam generated in the evaporation chamber Y is fed into the reaction chamber Z where an absorption reaction takes place.

However, if a conventional solution (absorbent) and a conventional solvent (an agent to be absorbed) are used as such, the solution is gradually diluted by the absorption of the solvent vapor, and with it, the amount of the heat of absorption generated decreases. Thus, when the difference in temperature between the solution and the solvent vapor becomes equal to the difference in elevated boiling point, the heat of absorption ceases to be generated, and the heating action of the system comes to a halt.

In order, therefore, to cause this heating system to function properly, it is necessary to prevent dilution of the solution and to maintain its concentration constant. Long investigations of the present inventor have led to the discovery that this problem can be solved completely by forming an oil layer on a solution of a substance generating the heat of absorption in the reaction chamber Z.

No clear cause has yet been able to be assigned to such a phenomenon. It is presumed however that when a solution alone is used, the solvent vapor generated by the heat of absorption is again absorbed in the form of a vapor or droplets by the solution to dilute the solution gradually, but that when an oil layer is formed on the solution, contacting of the solvent vapor generated by absorption with the surface of the solution is obstructed by the oil layer, and therefore, the solvent vapor is supplied continuously to the condenser chamber X (heat-exchanging chamber) without re-absorption by the solution.

The oil component used for this purpose is required to have certain important properties. For example, it should be immiscible with water; it should have a lower specific gravity than a solution of a substance generating the heat of absorption; it should be non-volatile; it should have a high flash point; it should be a chemical stable at use temperatures; it should have reduced corroding tendency; it should be safe; and it should give off little offensive odor. Examples of the oil component include vegetable oils and heat medium oils, for example, various petroleum hydrocarbon oils or organic synthetic oils such as diphenyl ether, terphenyl and a mixture of these.

The substance capable of generating the heat of absorption is required to rise greatly in boiling point, have a great ability to generate heat and reduced corroding tendency, and be stable at use temperatures. It should also be free of flammability and toxicity, and easily available. Examples generally include strong alkalies such as NaOH, strong acids such as $H_2SO_4$, and neutral salts such as LiCl, LiBr, $CaCl_2$, $CaBr_2$, $MgCl_2$ and $ZnCl_2$. However, a strong alkali such as NaOH or a strong acid such as $H_2SO_4$ has high reactivity, is extremely corrosive under heat, and involves danger in handling. With regard to the salts, $MgCl_2$ is liable to decompose at a temperature of 120° C. or higher, and $ZnCl_2$ has a great corroding tendency. Thus, examples of suitable heat generating substances for use in this invention include LiCl, LiBr, $CaCl_2$, $CaBr_2$, etc. $CaCl_2$ is most suitable because of its reasonable cost. Since, however, $CaCl_2$ or $CaBr_2$ alone achieves only a small increase in boiling point and is slightly inferior in heat-generating ability, it is desirably used in combination with LiCl or LiBr.

In the prior art, these salts are used as a solution in a solvent such as water, and the maximum increase in boiling point in saturated solutions is about 70° C. for LiCl and LiBr, about 45° C. for $CaCl_2$, and about 50° C. for $CaBr_2$.

The present inventor has exprimentally found however that the boiling point of a molten liquid of $CaCl_2$ containing water of crystallization is about 180° C., and the increase in boiling point is 80° C. Specifically, when $CaCl_2$ containing water of crystallization (a product of Tokuyama Soda Co., Ltd.; purity about 75%) was gradually heated without adding water, it began to melt at about 60° C., and became a complete liquid at about 110° C. On further heating it boiled at about 180° C. The salt which has once been melted remains liquid even at ordinary temperatures and is difficult of solidification. $CaCl_2$ exists as a monohydrate, dihydrate, tetrahydrate and hexahydrate. But commercially available $CaCl_2$ is considered to be a mixture of these hydrates. It is presumed that with an increase in temperature, it changed from the hexahydrate to the tetrahydrate (30° C.), further to the dihydrate (45° C.), and finally to the monohydrate (175° C.), and during this time, $CaCl_2$ dissolved in the water of crystallization precipitated.

There are organic solvents such as alcohols and acetone as the solvent in addition to water. But these organic solvents have the defect that they have high toxicity and flammability, cause only a small increase in boiling point, and produce only a small amount of energy.

Figure 3:
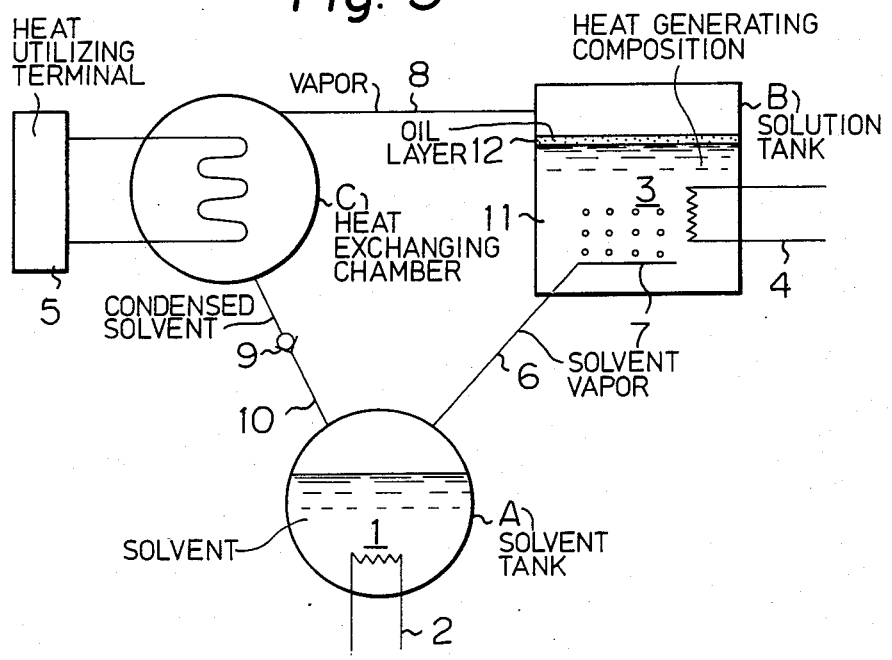
FIG. 3 is a system diagram showing one example of the heating system illustrated in FIG. 2.

One example of the present invention is generally described with reference to the system diagram shown in FIG. 3.

The reference letter A represents a solvent tank which contains a solvent 1 therein and a heater 2 disposed therein for heating the solvent 1, and corresponds to the evaporating chamber Y in FIG. 2. The reference letter B represents a solution tank which contains a heat-generating composition 3 therein and a heater 4 disposed therein for heating the heat generating composition 3, and corresponds to the reaction chamber Z in FIG. 2. The reference letter C represents a heat-exchanging chamber for supplying heat to a heat utilizing terminal 5 for heating, t water supply, etc., and corresponds to the condenser chamber X in FIG. 2. The vapor phase of the solvent tank A communicates with the solution tank B by a pipe 6. The pipe 6 has provided at its one end a nozzle 7 for blowing a vapor of the solvent into the heat-generating composition 3 in the solution tank B. The vapor phase of the solution tank B communicates with the heat-exchanging chamber C by a pipe 8, and the heat-exchanging chamber C communicates with the solvent tank A by a pipe 10 having a check valve 9 provided at its intermediate portion. The check valve 9 serves to prevent the vapor in the solvent tank A from flowing backward into the heat-exchanging chamber C.

The heat-generating composition 3 accommodated in the solution tank B consists of a concentrated solution 11 capable of generating the heat of absorption upon absorption of a vapor of the solvent 1 and an oil 12 having a lower specific gravity than the concentrated solution 11. The oil 12 forms a layer of the oil 12 on the concentrated solution 11 in the solution tank B.

In operation, the temperature of the heat-generating composition 3 in the solution tank B is maintained at a temperature slightly lower than the boiling point of the solution, specifically at about 120° to 150° C., by the heater 4 disposed in the solution tank B. At the same time, the solvent 1 is evaporated by the heater 2 disposed in the solvent tank A. The solvent vapor is jetted into the solution 11 in the solution tank B from the nozzle 7 through the pipe 6 to induce an absorption reaction. Owing to the heat generated by the absorption reaction, the temperature of the solution 11 rises to the boiling point, and simultaneously a high temperature vapor having approximately the same temperature as the boiling point is formed. This vapor is supplied to the heat-exchanging chamber C through the pipe 8 to use it as a heat source. The heat obtained by heat exchange is supplied to a heat utilizing terminal 5 for heating, hot water supply, etc. The solvent 1 which has decreased in temperature is recovered by the solvent tank A through the pipe 10. The above cycle is repeated successively.

In the above example, the heat-exchanging chamber C may be disposed within the solution tank B without connecting them by the pipe 8.

According to this example, the concentration of the solution 11 can be maintained substantially constant over a long period of time by forming the layer of the oil 12 on the solution 11 generating the heat of absorption. Accordingly, heat can be stably obtained by the simple device without separately providing a concentrating device for the solution 11. Furthermore, since this example utilizes the heat of absorption, there is no fear of accidents owing to fire or combustion gases, and safety can be secured.

Another example is generally shown by the system diagram of FIG. 4. This example differs from the foregoing example only in that the solvent tank A is accommodated within the solution tank B, and the other construction is the same as in the foregoing example. Hence, a detailed description of the other construction is omitted.

According to this example, the solvent tank A is positioned in the heat-generating composition 3 within the solution tank B. The solvent tank A is not directly heated, but by the heater 4 disposed within the solution tank B, the solvent 1 is heated together with the heat-generating composition.

Even when the temperature of the heat-generating composition reaches the boiling point of the solvent 1, the solution 11 does not boil owing to the effect of boiling point elevation, but only the solvent 1 boils to produce a vapor. For example, when an aqueous solution (in a concentration of about 60 to about 50%) of a mixture of $LiCl$ and $CaCl_2$ in a mixing ratio of from 1:3 to 3:2 is used, the increase in boiling point is about 63 to about 35° C., and when the heat-generating composition 3 is heated to about 150° C., the vapor pressure in the solvent tank A reaches about 5 atmospheres. The vapor of the solvent 1 so generated is jetted out into the solution 11 through the pipe 6 and the nozzle 7 and generates the heat of absorption.

According to this example, the device on the whole becomes compact because the solvent tank A is accommodated in the solution tank B. Moreover, it is easy to control the temperatures of the two tanks, and the heat efficiency increases.

Figure 5:
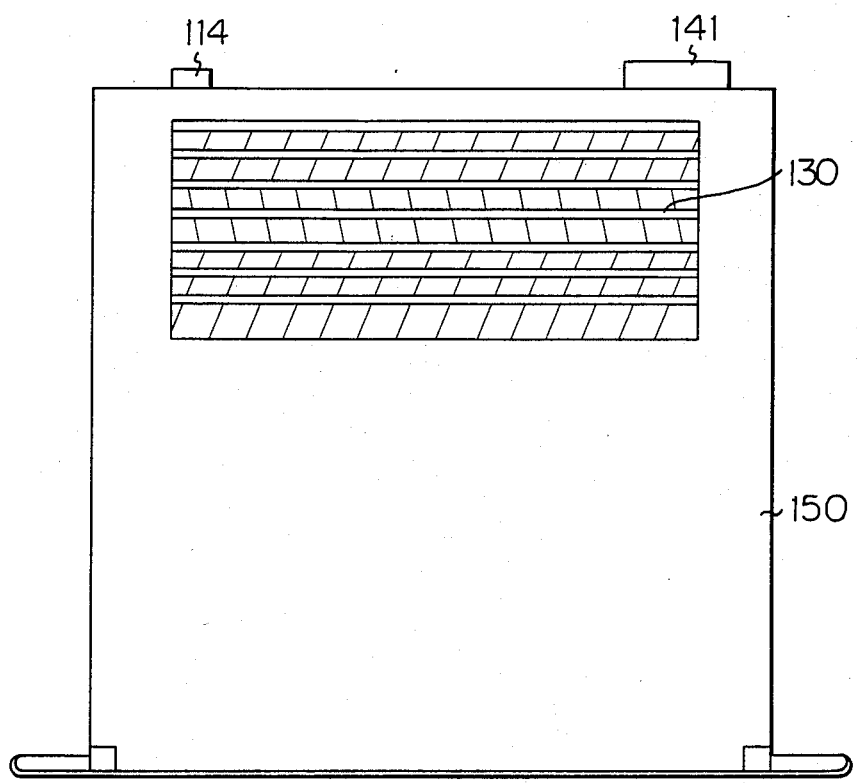
FIGS. 5 to 7 show a heating device embodying the example shown in FIG. 3, FIG. 5 being a front elevation thereof, FIG. 6 being a longitudinal sectional view thereof and FIG. 7 being a partially broken-away rear view thereof.
Figure 6:
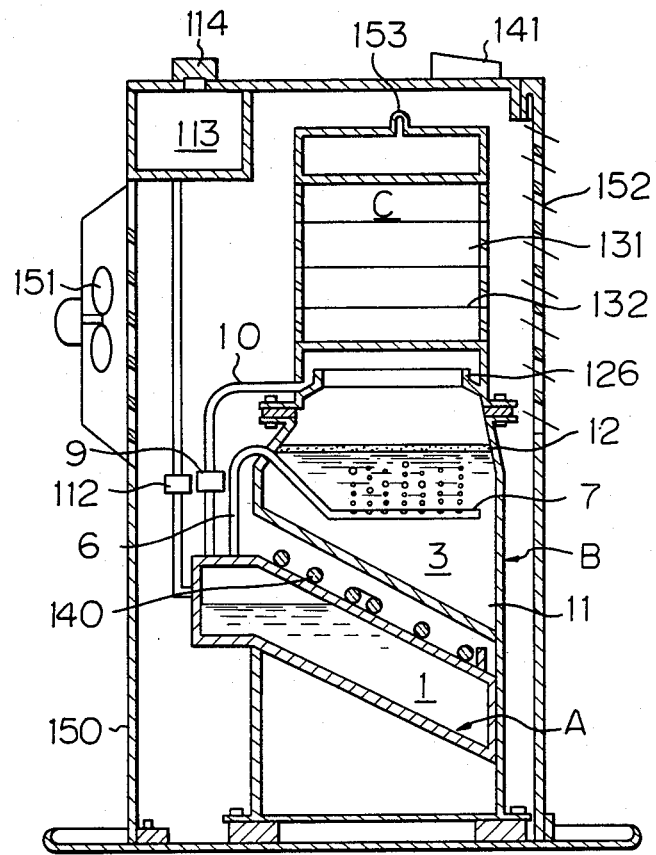
Figure 7:
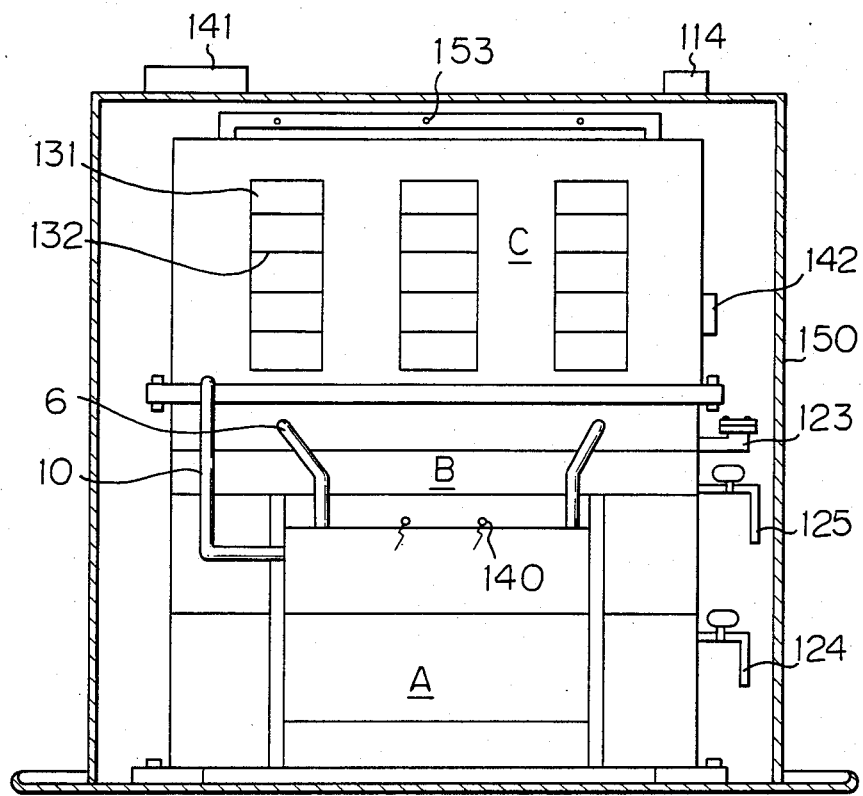

Now, a heating system embodying the example shown in FIG. 3 will be described with reference to FIGS. 5 to 7.

The reference numeral 150 represents a casing, and within the casing 150, a solvent tank A, a solution tank B and a heat exchanging chamber C are arranged in an ascending order. A heater 140 is disposed between the solvent tank A and the solution tank B to heat the two tanks simultaneously.

The solvent tank A contains a solvent 1 therein, and is connected to a solvent supply tank 113 through an automatic solvent feeding device 112. When the water level in the solvent tank A decreases below a certain fixed level, the solvent 1 is fed by the operation of the automatic solvent feeding device 112, and consequently, the level of the solvent 1 is always kept constant. The automatic solvent feeding device 112 may be any device known in the art, for example a device comprised of a device (not shown) for detecting the level of the solvent 1 in the solvent tank A and an electromagnetic valve operable in interlocking relation with the water level detecting device. When the vapor pressure in the solvent tank A is high, the vapor of the solvent 1 is likely to flow backward to the solvent supply tank 113. To prevent it, a check valve may be provided, as required, directly at the automatic solvent feeding device 112 or at another site. In the drawing, the reference numeral 114 represents a solvent replenishing opening provided in the solvent supply tank 113.

The solution tank B located above the solvent tank A contains a heat-generating composition 3 and communicates with the solvent tank A by a pipe 6 having a nozzle 7 connected thereto at its one end. A solution supply opening 123 is provided at an upper position on the side of the solution tank B, and a solution discharging opening 124, at a lower position. A drain pipe 125 is provided to maintain the level of the heat-generating composition 3 at a fixed one.

A communicating hole 131 extending in the front and rear directions is provided in the heat-exchanging chamber C located above the solution tank B and having a space communicating with the tank B. A plurality of heat radiating fins 132 are arrayed. An air vent 153 is formed in the upper wall of the heat-exchanging chamber C. At the lower end of the inside wall of the heat-exchanging chamber C is provided a trough-like member 126 for collecting the solvent 1 liquefied in the heat-exchanging chamber C. The collected solvent 1 is recovered by the solvent tank A through the pipe 10 having a check valve 9 in its intermediate part.

An electric heater 140 disposed between the solvent tank A and the solution tank B serves to heat the solvent tank A and the solution tank B simultaneously. The heater 140 is controlled by a thermostat 142 through a control box 141 provided on the upper surface of the casing 140.

The reference numeral 151 represents a blower provided at an opening portion of the casing 150 rearwardly of the heat-exchanging chamber C, and the reference numeral 152 represents a louver secured to an opening portion of the casing 150 frontwardly of the heat-exchanging chamber C.

The operation of the heating system shown in FIGS. 5 to 7 will be described.

When the solvent tank A and the solution tank B are heated by the heater 140 so that the temperature of the inside of the solvent tank A becomes equal to, or higher than, the temperature of the inside of the solution tank B, the solvent 1 first boils owing to the effect of boiling point elevation of the solution 11, and the vapor of the solvent 1 is jetted into the solution 11 through the pipe 6 and the nozzle 7 and produces the heat of absorption. The heat of absorption brings the temperature of the solution 11 to its boiling point, and simultaneously produces a high temperature vapor. This vapor is then sent to the heat-exchanging chamber C, and its heat is radiated by the radiating fins 132. Air warmed by this heat radiation is blown to the front surface of the system by the blower 151. On the other hand, the solvent 1 liquefied in the heat-exchanging chamber C is recovered by the solvent tank A through the trough-like member 126 and the pipe 10.

When the solution 11 is diluted by absorption of the vapor of the solvent 1 and the level of the solution tank B reaches a predetermined level, the heat-generating composition 3 is discharged through the drain pipe 125. When the dilution of the solution 11 proceeds and the generation of the heat of absorption decreases, the heat-generating composition 3 is exchanged with a new one.

Two heating systems embodying the example shown in FIG. 4 will be described.

First, one heating system will be described with reference to FIGS. 8 to 14.

The reference numeral 210 represents a casing, and a mounting frame 211 is provided upright at the lower portion of the casing 210. A setting stand 212 is provided in a protruding manner opposite to the mounting frame 211. A solution tank B is placed on, and fixed to, the setting stand 212.

The solution tank B accommodates a solvent tank A and has provided a heater 250 at its lower portion and a heat-exchanging chamber C at its upper portion. There are provided in the solvent tank A a generally inverted U-shaped solvent vapor feeding pipe 270 extending from the solvent tank A to the liquid phase of the solution tank B through the heat-exchanging chamber C, and a generally inverted U-shaped vapor pipe 280 extending to the vapor phase of the solution tank B through the heat-exchanging chamber C.

The solution tank B contains a heat-generating composition 3, and has a solution receiving portion 224 formed near the end of the vapor pipe 280. An air discharging pipe 225 is provided extending upwardly from the vapor phase of the solution tank B and through the heat-exchanging chamber C, and an automatic feeding device 228 is also provided which communicates with a solution supply tank 227 through an electromagnetic valve 226. The electromagnetic valve 226 is formed such that it is interlocked with a water level detecting device 229 within the solution tank B and when the amount of the solution 11 decreases, it feeds the solution 11 to the solution tank B from a solution supply tank 227. An overflow pipe 230 is provided in the solution tank B so that when a certain fixed water level is exceeded, the solution 11 can be stored in a discharge tank 232 through a discharge liquid strainer 231. As shown in FIG. 14, the discharge liquid strainer 231 is formed in a multilayer construction by means of partitioning walls 234 partly having a communicating space 233, in which filter materials such as sand having progressively decreasing particle diameters are filled in the individual spaces formed by the adjoining partitioning walls 234. A valve 236 is provided between the liquid discharge strainer 231 and the liquid discharge tank 232. At the upper end of the air discharge pipe 225, there is provided a vapor cooling chamber 238 having an air vent 237. This is for the purpose of reducing the pressure of the inside of the solution tank B, and recovering the cooled and liquefied solution 11 into the solution simply tank 227 by means of the drain pipe 239.

The solvent tank A is constructed of a plurality of structures each consisting of a pipe 241 formed in the shape of a frame and communicating pipes 242 alinged in juxtaposition across the opposite sides of the pipe 214, said structures being laid on one top of another and connected by vertically extending communicating pipes 243, as clearly shown in FIGS. 11 and 12. An automatic feeding device 245 for the solvent is also provided in the solvent tank A. The automatic feeding device 245 is connected to a solvent supply pipe 246 extending upright from the solvent tank A. The pipe 246 is further connected to a solvent supply tank 248 through an electromagnetic valve 247. Since during the use of the system, the pressure of the inside of the solvent tank A becomes high, a check valve is desirably provided in the automatic feeding device 245.

The heater 250 is fixed to the mounting frame 211 so that it makes contact with the bottom plate of the solution tank B. The heater 250 is comprised of a tank 252 containing a heat medium oil 251, an electric heater 253 provided within the tank 252, a thermostat 254 provided in the circuit of the electric heater 253, and a heat medium oil pipe 255 projecting into the solution tank B from the tank 252. It heats the solution 11 in the solution tank B when the electric heater 253 conducts. At a part of the heat medium oil pipe 255, there is provided a supply opening 256 for supplying the heat medium oil 251.

The heat-exchanging chamber C serves to radiate the heat of a fluid passing through the solvent vapor supply pipe 270, the vapor pipe 280 and the air discharge pipe 225 into the atmosphere, and has a number of heat-radiating fins 261 provided therein. A blower 262 is provided at that part of the casing 210 which is rearwardly of the heat-exchanging chamber C, and a louver 263 is provided on the front surface of the casing 210. This is for the purpose of efficiently radiating the high heat of the heat-exchanging chamber C into the atmosphere.

A blow-off pipe 272 having a number of small holes 271 is provided at that end of the solvent vapor feeding pipe 270 which is on the liquid phase side of the solution tank B, so that the vapor of the solvent 1 may be uniformly released into the solution 11.

An injector 281 is provided in an intermediate part of the vapor pipe 280, and a suction pipe 282 extends from the injector 281 into the solution 11. Hence, the solution 11 is sucked from the sucking pipe 282 by the negative pressure of the injector 281 which is generated by the vapor of the solvent 1 from the vapor pipe 280. In the vapor pipe 280 leading to the solution tank B, the solution 11 diluted with the solvent 1 falls into the liquid receiving portion 224 while generating the heat of absorption. The solution is then released into the solution 11 in the solution tank B.

The solution tank B and the heater 250 are covered with a heat insulator material in order to increase the heat efficiency.

The operation of the heating system in accordance with the example described with reference to FIGS. 8 to 14 will be described.

When the temperature of the solution 11 has reached the boiling point of the solvent 1 by the heater 250, the solution 11 does not boil owing to the effect of boiling point elevation. Only the solvent 1 in the solvent tank A boils and actively generates a vapor.

The vapor generated in the solvent tank A gets into the solvent vapor feeding pipe 270 and the vapor pipe 280. The vapor which has passed through the solvent vapor feeding pipe 270 is jetted out into the solution 11 of the solution tank B from the small holes 271 of the blow-off pipe to generate the heat of absorption. On the other hand, the vapor which has flowed into the vapor pipe 280 makes contact with the solution 11 sucked from the suction pipe 282 by the injector 281, and generates the heat of absorption during passage through the vapor pipe 280. Thus, it gains a higher temperature and again flows down into the solution tank B. Furthermore, this solution 11 falls as small droplets as a result of passing through many small holes provided in the liquid receiving portion 224. By dispersing the droplets as finely as possible, the surface area of the falling solution 11 per unit volume is increased, and the rate of evaporation of the solvent is increased. As a result, the solution 11 can be concentrated effectively.

The heat generated by the absorption reaction is radiated into the air through the heat-exchanging chamber C, and the warmed air is blown out of the heating system by the blower 262.

The vapor which has passed through the air discharge pipe 225 is liquefied in the vapor cooling chamber 238, and recovered by the solution supply tank 227 through the drain pipe 239. When the solution 11 is diluted by the absorption of the solvent vapor and the solution level in the solution tank B reaches a predetermined level, the solution is discharged into a waste solution tank 232 through the overflow pipe 230 and a waste liquid strainer 231.

The heating system described above has the following unique advantages.

Since the injector 281 is formed by utilizing the vapor pressure of the solvent 1 generated from the solvent tank A and the solution 11 is stirred without using any exterior power, the absorption reaction can be carried out uniformly and efficiently.

Furthermore, since the solution 11 is effectively concentrated by dispersing the solution 11 as fine droplets by the liquid receiving portion 224, the decrease of the concentration of the solution 11 can be minimized and the period of use of the solution 11 can be prolonged.

By providing not only the air discharge pipe 225 but also the solvent vapor feeding pipe 270 and the vapor pipe 280 so as to extend through the heat-exchanging chamber C, the heat-exchanging chamber C can also be utilized as a high heat source in addition to its inherent function of feeding the solvent vapor 1 or circulating the solution 11. Particularly, in the vapor pipe 280, the absorption reaction is carried out during passage through the heat-exchanging chamber C, and therefore, the amount of heat generated is large.

The other heating system embodying the example shown in FIG. 4 will be described with reference to FIGS. 15 and 16.

In the drawings, the reference numeral 310 represents a casing which has provided therein a main solution tank $B_1$, a subsidiary solution tank $B_2$, a solvent supply tank 350 and a heat-exchanging chamber C.

The main solution tank $B_1$ is placed on, and fixed to, a mounting stand 321 within the casing 310, and its surrounding is covered with a heat insulator material. The main solution tank $B_1$ contains a heat-generating composition 3, and in the heat-generating composition 3 are positioned a main solvent tank $A_1$ disposed only within the main solution tank $B_1$, and a subsidiary solvent tank $A_2$ connected to the subsidiary solution tank $B_2$ by a pipe as described hereinbelow. The reference numeral 326 in the drawings represents an opening for supplying the solution 11. Heater pipes 327 as auxiliary heat source are provided which extend to the side of the main solvent tank $A_1$ and the subsidiary solvent tank $A_2$ from outside of the main solution tank $B_1$.

The main solvent tank $A_1$ is formed by constructing a pipe into the form of a frame and accommodating the solvent 1 therein. The lower portion of the main solvent tank $A_1$ communicates with the solvent supply tank 350 through a valve 328 and an electromagnetic valve 329.

From the top of the main solvent tank $A_1$, an inverted U-shaped blow-off pipe 330 extends upwardly so that its top portion goes beyond the heat-generating composition 2 in the main solution tank $B_1$.

Like the main solvent tank $A_1$, the subsidiary solvent tank $A_2$ is formed by constructing a pipe into the form of a frame and accommodating the solvent 1 therein. The lower portion of the subsidiary solvent tank $A_2$ communicates with the solvent supply tank 350 through a valve 331 and an electromagnetic valve 332. An injector pipe 334 having an injector 333 formed therein is provided so that it stands upright from the upper portion of the subsidiary solvent tank $A_2$. The forward end of the injector pipe 334 communicates with the vapor phase of the subsidiary solution tank $B_2$. One end of a suction pipe 335 having its other end located in the solution 11 of the main solution tank $B_1$ communicates with the injector 333 of the injector pipe 334.

A drain 337 is provided at the lower portion of the main solution tank $B_1$ in order to withdraw the heat-generating composition 3.

The subsidiary tank $B_2$ is placed on, and fixed to, a mounting stand 342 within the casing 310, and its surrounding is covered with a heat insulator material 343. The subsidiary tank $B_2$ contains the heat-generating composition 3 therein, and this heat-generating composition 3 communicates with the heat-generating composition 3 of the main solution tank $B_1$ by a plurality of communication pipes 344. A heater pipe 345 is located in the lower portion of the subsidiary solution tank $B_2$. Furthermore, a drain 346 is provided in order to withdraw the heat-generating composition 3. A supply opening 347 for the heat-generating composition 3 is provided in the upper portion of the subsidiary solution tank $B_2$. An air discharging pipe 349 is also provided which extends from the vapor phase portion at the upper portion ff the subsidiary solution tank $B_2$ and leads to the vapor phase of the solvent supply tank 350 through an air discharging port 348.

The solvent supply tank 350 contains the solvent 1, and supplies the solvent 1 successively to the main solvent tank $A_1$ and the subsidiary solvent tank $A_2$. An opening 351 for supplying the solvent 1 is provided at the top of the solvent supply tank 350, and an outer air pipe 353 having small holes 352 is also provided at the upper portion of the tank 350.

The heat-exchanging chamber C is located between the main solution tank $B_1$ and the subsidiary solution tank $B_2$, and is formed by providing heat-radiating fins 361 between the injector pipe 334, the communication pipes 344 and the air discharge pipe 349. In the drawings, the reference numeral 362 represents a blower.

A control box 311 is provided at that part of the inside of the casing 310 which corresponds to a position below the heat-exchanging chamber C.

The operation of the above heating system described with reference to FIGS. 15 and 16 will be described.

The heat-generating composition 3 is put in the main solution tank $B_1$ and the subsidiary solution tank $B_2$ from the supply openings 326 and 327, and the solvent 1 is put in the solvent supply tank 350 from the supply opening 351. Then, an electric current is passed through the heater pipes 327 and 345 to heat the heat-generating composition 3 in the main solution tank $B_1$ and the subsidiary solution tank $B_2$ and the solvent 1 in the main solvent tank $A_1$ and the subsidiary solvent tank $A_2$. As a result, the temperature of the solvent 1 reaches its boiling point. But at this time, the solution 11 does not boil owing to the effect of boiling point elevation, and only the solvent 1 boils to generate a vapor.

The solvent vapor 1 generated in the main solvent tank $A_1$ is blown into the solution 11 in the main solution tank $B_1$ from the blow-off pipe 330 to generate the heat of absorption. The solvent vapor 1 generated in the subsidiary solvent tank $A_2$ is injected into the subsidiary solution tank $B_2$ through the injector pipe 334. By the negative pressure of the injector 333 generated by the jetted stream of the vapor, the solution in the main solution tank $B_1$ is sucked into the injector pipe 334 through the suction pipe 335. In the injector pipe 334, the solution 11 is mixed with the solvent vapor 1, and while generating the heat of absorption, it is fed into the subsidiary solution tank $B_2$. Steam generated by the heat of absorption in the main solution tank $B_1$ and the subsidiary solution tank $B_2$ is liquefied while it is passed through the air discharging pipe 349 and the air discharging port 348, and recovered into the solvent supply tank 350. The fluid which has gained a high temperature by the heat of absorption is heat-exchanged during its passage through the injector pipe 334, the air discharge pipe 349 and the communication pipes 344 forming the heat-exchanging chamber C, and releases heat into the atmosphere. The air warmed by this heat radiation is blown out of the system by the blower 362.

The system described above has the following unique advantages.

First of all, like the aforesaid system shown in FIGS. 8 to 14, this heating system has the advantage that the injector is formed by utilizing the vapor pressure of the solvent 1 generated from the subsidiary solvent tank $A_2$, and the stirring of the solution 11 can be automatically effected.

Since, the solution tank B is composed of the main solution tank $B_1$ and the subsidiary solution tank $B_2$ and the injector pipe 334 and the communication pipes 344 which are the communicating portion between the two solution tanks $B_1$ and $B_2$, the vapor of the solvent 1 generated by the heat absorption and the heat-generating composition 3 which has gained a high temperature owing to the heat of absorption can be effectively utilized as heat sources, and the heat efficiency is very high.

Experiments have been conducted to show how it is difficult to dilute the heat-generating composition used in this invention. The experiments and the results are described below with reference to FIGS. 17 and 18.

The heating system shown in FIGS. 15 and 16 was used as a model system in performing these experiments. The purpose of these experiments is to make it clear how the concentration of the solution 11 of the heat-generating composition 3 changes with the supply of the solvent 1. The experiments were performed by maintaining the amount of water supplied per unit time constant, and measuring the amount of increase of the solution 11 in the solution tank B during this time. The following materials were used as the heat-generating composition 3.

(a) As an aqueous solution of a salt, a solution of 4.0 kg of $CaCl_2$ and 2.0 kg of LiCl in 1 liter of water was used (shown by broken line a in the drawings).

(b) As a molten liquid of a salt, one obtained by heat-melting 6.4 kg of $CaCl_2$ was used (shown by one-dot chain line b in the drawings).

(c) The following compositions composed of an aqueous solution or molten liquid of a salt and an oil 12 were used.

(1) A composition obtained by adding 0.5 liter of a white oil ("Hi-White", a tradename for a product of Nippon Oil Co., Ltd.) to a molten liquid of a mixture of 4.2 kg of $CaCl_2$ and 2.0 kg of LiCl.

(2) A composition obtained by adding 0.5 liter of an organic synthetic heat medium oil ("Thermace", a tradename for a product of Nippon Oil Co., Ltd.) to a molten liquid of a mixture of 4.2 kg of $CaCl_2$ and 2.0 kg of LiCl.

(3) A composition obtained by adding 0.2 liter of a vegetable oil ("Salad Oil", a tradename for a product of Nisshin Seiyu Co., Ltd.) to an aqueous solution of 4.2 kg of $CaCl_2$ and 1.0 kg of LiCl in 0.5 liter of water.

Since the aforesaid three examples in which the oil 12 was added showed almost the same result, these three examples are not distinguished in the graphs but the results are shown by one solid line C.

FIG. 17 is a graph obtained by plotting the amount increased (liters) of the volume of the solution 11 by absorption of the solvent (water) 1 on the ordinate, and the time elapsed (hours) on the abscissa. FIG. 18 is a graph showing changes in the concentration of the solution 11 with an increase in the volume of the solution 11, the ordinate showing the concentration of the salt (% by weight; for the molten liquid, this is taken as 100% by weight for convenience), and the abscissa showing the time elapsed (hours). The thin line in FIG. 17 indicates the amount of the solvent (water) 1.

It is seen from these graphs that when the oil 12 is not added to the heat-generating composition 3, almost all the water supplied remains in the solution tank B in the case of both the aqueous solution and the molten liquid and reduces the concentration of the solution 11 of the heat-generating composition 3 and thus gradually reduces its heat generating ability. On the other hand, it is seen that when the oil 12 is added to the heat-generating composition 3, the amount of increase of the solution 11 in the solution tank B is very small, and therefore, the concentration of the solution 11 is nearly constant and the heat-generating ability lasts over an extended period of time.

According to the embodiments described hereinabove, the amount of heat generation is not as large as in the case of fossil fuels. Furthermore, since no combustion reaction occurs, there is no fear of fire, and the absence of combustion gases makes the system safe and obviates the need for ventilation. Accordingly, by using the heat-generating device of this invention, there can be provided a heating system which can be easily controlled and safely used even by children or by sick persons lying in bed. Another advantage is that the heat-generating composition used in this invention is easily available because of its low price and its service life is long, and therefore that the cost of the heat-generating device of this invention is low.

As a further embodiment, a hot water supply system utilizing the heat-generating device of this invention is described below with reference to FIGS. 19 to 23.

FIG. 19 is a system diagram showing the entire hot water supply system. The water supply system in accordance with this embodiment is constructed by connecting a solvent tank A containing a solvent 1, a solution tank B containing a heat-generating composition 3 and a heater 2 therein, and a heat-exchanging chamber C for free communication with each other, providing a water supply port 400 communicating with one side of the heat-exchanging chamber C and further providing a hot water supply tank 401 communicating with the other side of the heat-exchanging chamber C.

The solvent tank A is covered with a heat insulator material. A vapor pipe 403 extending from the vapor phase 402 of the solution tank B communicates with the solvent tank A through the heat-exchanging chamber C, and on the other hand, by a water feeding pipe 404, the solvent vapor 1 is blown into the heat-generating composition 3 in the solution tank B. A safety valve 405 is provided at the vapor phase 402 of the solution tank B in order to confirm the safety of the vapor pipe 403. An electromagnetic valve 406 and a pressure gauge 407 are secured to the end of the water-feeding pump 404, and a return circuit to the solvent tank A is provided by means of a relief valve 408. A blow-off section 409 is formed in the solution tank B, and from a blow-off hole 410, the solvent vapor 1 is blown into the heat-generating composition 3 of the solution tank B.

The heater 2 provided in the solution tank B for elevating the temperature for increased reactivity is composed of a stainless steel pipe and a heater included therein so that no wire breakage occurs within the heat-generating composition. The heater 2 is used to elevate the temperatures of the heat-generating composition 3 and the solvent 1 at the blow-off section 409. To confirm the amount of the solution, a liquid meter 411 is provided to communicate with the upper portion of the solution tank B by means of two communication pipes 412. A vertically long inspection window 413 is provided in the liquid meter 411, and an electrode 414 for adjusting the amount of the solution and an electromagnetic valve (not shown) for water feeding are also provided. The electrode 414 serves to stop feeding of the heat-generating composition 3 when the amount of the solution reached a fixed value and stops the operation of the heater 2 when the amount of the solution falls below the fixed amount. An opening 415 for supplying the heat-generating composition 3 is provided in the upper surface of the solution tank B, and a withdrawal opening 416 is provided at the lower surface of the solution tank B. A temperature adjusting meter 417 if also disposed in the solution tank B. According to the difference from a preset temperature, the temperature adjusting meter 417 controls the heater 2. The blow-off section 409 and the heater 2 are located within the heat-generating composition 3 in the solution tank B.

The heat-exchanging chamber C has a vapor pipe 403 therein, and also the water supply port 400 at its lower portion and a hot water supply pipe 418 at its upper portion leading to the water supply tank 401 through a thermometer 419 on the way. Separately, a discharging drain 420 is provided in the lower section of the heat-exchanging chamber C. The water supply port 400 and the water supply tank 401 are connected to each other by a circulating pipe 423 through a circulating electromagnetic valve 422 operable by a temperature adjusting meter 421 provided in the water supply tank 401 in addition to the aforesaid water supply pipe 418. A water delivery pipe 424, a drain 425 and a safety valve 426 are provided in the water supply tank 401. A port 427 for supplying water to the solution tank A from the heat-exchanging chamber C is provided, and an electromagnetic valve 428 is also disposed.

The heat-generating composition 3 accommodated in the solution tank B consists of a concentrated solution 11 capable of generating the heat of absorption upon absorbing the solvent vapor 1 and an oil 12 having a lower specific gravity than the concentrated solution 11. This oil 12 forms a layer of the oil 12 on the concentrated solution in the solution tank B.

The operation of the hot water supply system in accordance with the embodiment shown in FIGS. 19 to 23 will be described.

The solvent 1 is put in the solvent tank A, and the heat-generating composition composed of the solution 11 and the oil 12 is put in the solution tank B. By the heater 2 in the solution tank B, the heat-generating composition 3 and the solvent 1 in the blow-off section 409 are heated. The heating is carried out until the boiling point of the solution 11 of the heat-generating composition 3, specifically about 150° to about 180° C., is reached.

As a result, since the solvent 1 has already reached its boiling point, it is blown into the heat-generating composition 3 from the blow-off hole 410 of the blow-off section 409, and an absorption reaction is effected. The solvent vapor is generated by this absorption reaction and heat-exchanged. Then, the next absorption reaction is effected, and thereafter, the generation of the vapor and the absorption reaction are effected successively.

It is generally known that the absorption reaction becomes remarkable when stirring is carried out simultaneously. In the present system, the blow-off section 409 is formed at the central part, and the temperature is elevated to a high degree by the absorption reaction, and outwardly of the blow-off section 409, stirring is effected by the decrease of the temperature.

When the temperature of the inside of the solution tank B becomes high by such an absorption reaction, the solvent 1 which has induced the absorption reaction is converted to a vapor which is led to the heat-exchanging chamber C by the vapor pipe 403. As a result, in the heat-exchanging chamber C, the vapor is heat exchanged with water from the water supply port 400. The vapor of the solvent 1 is liquefied and sent to the solvent tank A. At the same time, water becomes hot, and sent to the water supply tank 401 by the water supply pipe 418. When at this time the hot water in the water supply tank 401 does not attain a present temperature, it is again introduced into the heat-exchanging chamber C by the circulating pipe 423 to increase its temperature further.

An experiment was carried out with regard to the above embodiment of the hot water supply system, and the experimental results are given below.

Place of experiment: Experimental Room for Agricultural and Forestry Engineering, Tsukuba University, Japan Time: For about 17 hours between Apr. 21 and 28, 1983

Heat source: Electric wires of about 2.8 Kwh

Theoretical amount of heat generation: from $Q=V.I.$ 860 (K cal/h), 2425.2 (Kcal/h)

Water feeding: Temperature of water feeding 60° C.; Flow rate 166 liters/h.

The amount of heat $Q'$ (Kcal/hr) used to raise the temperature of water was calculated from (the temperature of the water flowing out of the heat-exchanging chamber—the temperature of the water flowing into the heat-exchanging chamber)×(the specific heat of water, which is 1)×(the flow rate of the circulating water, liters/hr). $Q$ and $Q'$ obtained after the present system attained a steady state are shown in FIG. 23.

As a result, $Q'$ was 120%, on an average, based on the theoretical amount of heat generation ($Q$). Thus, by the present system, a temperature rise of about 20% was measured.

In FIG. 23, Q" represents the effective amount of heat generation which is calculated when the amount of heat generation not used to elevate the temperature of the water, for example owing to heat radiation to the atmosphere, is supposed to be 14.8%. Q' is 141.7%, on the average, based on Q".

By utilizing the absorption reaction, the hot water supply system constructed by utilizing the heat-generating device of this invention can perform hot water supply continuously. It can be used not only in general homes, but also for heating vinyl plastic houses, for example. The heat-generating composition used in this sytem is easily available because of its reasonable price, and its service life is long. Thus, the cost of running can be reduced.

Since the solvent vapor can be liquefied in the heat-exchanging chamber, the liquefied solvent can be recycled to the solvent tank, and replenishing of the solvent is almost unnecessary.

What is claimed is:

1. A heat-generating device comprising a solution tank containing a heat-generating composition composed of a solution capable of generating the heat of absorption when absorbing a solvent vapor and an oil having a lower specific gravity than said solution, a solvent tank for supplying the solvent to the solution tank via nozzle means, heating means for heating said solvent and said heat-generating composition, and a heat-exchanging chamber disposed between the vapor phase of the solution tank and the solvent tank, connection means between said heat-exchanging chamber and said solvent tank for fluidly connecting said heat-exchanging chamber and said solvent tank, said connection means including one-way valve means allowing fluid flow only from said heat exchanging chamber to said solvent tank, and means connected in heat exchange relation with said heat-exchanging chamber and receiving heat therefrom.

2. The device of claim 1 wherein the solvent is water.

3. The device of claim 1 wherein the oil is a vegetable oil, a petroleum hydrocarbon oil, or an organic synthetic heat medium oil, and the solution is a solution of a substance selected from the group consisting of LiCl, LiBr, $CaCl_2$ and $CaBr_2$.

4. The device of claim 1 wherein said heating means comprises a first heater disposed within said solvent tank and a second heater disposed within said solution tank.

5. The device of claim 1, wherein said heating means comprises a heater disposed within said solution tank.

6. The device of claim 5, wherein said solvent tank is disposed within said solution tank and immersed in said solution, said heater being immersed in said solution exterior to said solvent tank.

* * * * *